(12) United States Patent
Tally et al.

(10) Patent No.: US 10,584,041 B2
(45) Date of Patent: Mar. 10, 2020

(54) WATER TREATMENT SYSTEM

(71) Applicants: RENEW GROUP PTE LTD, Singapore (SG); William N. Tally, Farmington Hills, MI (US); Dereck Kowalski, Farmington Hills, MI (US); Kevin Franicis Moran, Farmington Hills, MI (US); Manoj Bhargava, Farmington Hills, MI (US)

(72) Inventors: William N Tally, Milford, MI (US); Dereck Kowalski, Macomb, MI (US); Kevin Francis Moran, Farmington Hills, MI (US); Manoj Bhargava, Framington Hills, MI (US)

(73) Assignee: Renew Health Ltd, Athlone (IE)

( * ) Notice: Subject to any disclaimer, the term of this patent is extended or adjusted under 35 U.S.C. 154(b) by 0 days.

(21) Appl. No.: 15/755,167

(22) PCT Filed: Aug. 29, 2016

(86) PCT No.: PCT/US2016/049206
§ 371 (c)(1),
(2) Date: Feb. 26, 2018

(87) PCT Pub. No.: WO2017/035521
PCT Pub. Date: Mar. 2, 2017

(65) Prior Publication Data
US 2018/0265377 A1    Sep. 20, 2018

Related U.S. Application Data

(60) Provisional application No. 62/210,485, filed on Aug. 27, 2015.

(51) Int. Cl.
*C02F 1/06* (2006.01)
*B01D 1/06* (2006.01)
(Continued)

(52) U.S. Cl.
CPC ............... *C02F 1/06* (2013.01); *A01K 79/02* (2013.01); *B01D 1/065* (2013.01); *B01D 1/12* (2013.01);
(Continued)

(58) Field of Classification Search
CPC .......... C02F 1/004; C02F 1/008; C02F 1/041; C02F 1/048; C02F 1/06; C02F 1/08;
(Continued)

(56) References Cited

U.S. PATENT DOCUMENTS 3,425,235 A    2/1969  Cox
3,627,032 A    12/1971  Glad
(Continued)

OTHER PUBLICATIONS

Gao, P. et al. (2009) Desalination and Water Treatment, 10, 306-310.*
(Continued)

*Primary Examiner* — Brian A McCaig
(74) *Attorney, Agent, or Firm* — Oakland Law Group PLLC (57) ABSTRACT

The present disclosure relates a system for the treatment of water. The water treatment system may be linked an aquatic protection system or a water filtration system.

6 Claims, 9 Drawing Sheets

(51) Int. Cl.
| | |
|---|---|
| *C02F 1/00* | (2006.01) |
| *C02F 1/04* | (2006.01) |
| *B01D 3/10* | (2006.01) |
| *A01K 79/02* | (2006.01) |
| *B01D 1/22* | (2006.01) |
| *C02F 1/08* | (2006.01) |
| *B01D 1/16* | (2006.01) |
| *C02F 1/12* | (2006.01) |
| *B01D 1/12* | (2006.01) |
| *C02F 103/08* | (2006.01) |
| *A01M 29/30* | (2011.01) |

(52) U.S. Cl.
CPC ............... *B01D 1/16* (2013.01); *B01D 1/221* (2013.01); *B01D 3/10* (2013.01); *B01D 3/106* (2013.01); *C02F 1/004* (2013.01); *C02F 1/008* (2013.01); *C02F 1/041* (2013.01); *C02F 1/048* (2013.01); *C02F 1/08* (2013.01); *C02F 1/12* (2013.01); *A01M 29/30* (2013.01); *C02F 2103/08* (2013.01); *C02F 2201/001* (2013.01); *C02F 2209/001* (2013.01); *C02F 2209/42* (2013.01); *C02F 2301/024* (2013.01); *Y02W 10/37* (2015.05)

(58) Field of Classification Search
CPC .. C02F 1/12; B01D 1/065; B01D 1/12; B01D 1/16; B01D 1/221; B01D 3/10; B01D 3/106
See application file for complete search history.

(56) References Cited

U.S. PATENT DOCUMENTS

| | | | |
|---|---|---|---|
| 3,674,652 A | 7/1972 | Brown | |
| 4,363,703 A * | 12/1982 | ElDifrawi | B01D 3/346 |
| | | | 203/10 |
| 4,696,718 A | 9/1987 | Lasater | |
| 4,933,666 A | 7/1990 | Nelson | |
| 4,985,122 A | 1/1991 | Spencer | |
| 5,145,585 A | 9/1992 | Coke | |
| 5,176,637 A | 1/1993 | Dietrick | |
| 5,338,456 A | 8/1994 | Stivers | |
| 5,441,606 A * | 8/1995 | Schlesinger | B01D 1/0017 |
| | | | 202/176 |
| 5,531,865 A | 7/1996 | Cole | |
| 6,294,054 B1 | 9/2001 | Sutter | |
| 6,332,979 B1 | 12/2001 | Steffens | |
| 6,387,540 B1 | 5/2002 | Yoshidomi | |
| 6,926,808 B2 | 8/2005 | Shen | |
| 6,932,889 B1 | 8/2005 | Holcomb | |
| 7,250,223 B2 | 7/2007 | Miyachi | |
| 8,226,799 B1 | 7/2012 | Young | |

OTHER PUBLICATIONS

Extended European Search Report, Patent Application No. 16840246.9, dated Feb. 13, 2019.

International Report on Patentability for PCT/US2016/049206, dated Nov. 14, 2016.

* cited by examiner

WATER TREATMENT SYSTEM

FIELD OF THE DISCLOSURE

Generally, the present disclosure relates to the field of water treatment. More specifically, the present disclosure relates to systems for the treatment of water to remove unwanted material from the water.

BACKGROUND

Traditionally water treatment systems, such as those used in desalination, ground water remediation or liquid recycling plants, have high energy requirements which can account for between 50% and 70% of the total operating costs, making such plants prohibitively expensive and impractical, particularly in developing countries and in locations without a reliable energy supply.

In addition, known methods of liquid treatment such as reverse osmosis, utilizing activated carbon filtration and optionally ultra-violet or ozone exposure, typically do not have the capacity for efficient treatment of source liquids such as seawater or brackish water and usually require pre-treatment such as pre-filtration and/or chemical treatment. Additionally, filtration can lead to operational problems such as filter clogging and the need for sterilization of the filtration apparatus on a regular basis to prevent build-up of mold, algae and bacteria contaminants.

It is an object of the present disclosure to provide a water treatment system which provides a suitable treated product water and which is compatible with and complementary to other methods of water treatment. Further aspects and advantages of the present disclosure will become apparent from the ensuing description which is given by way of example only.

SUMMARY

According to the present disclosure there is provided a water treatment system for removing unwanted impurities from, where the water treatment device includes at least one tank, at least one heating element, at least one evaporator, at least one heat exchanger, at least one vacuum source; at least one power source and at least one pump.

Also, according to the present disclosure there is provided a system for treating salinated water which includes a water treatment system having at least one tank, at least one heating element, at least one evaporator, at least one heat exchanger, at least one vacuum source at least one power source and at least one pump, an aquatic protection system and a water filtration system.

DETAILED DESCRIPTION

This description provides illustrative examples of various aspects and embodiments of the present disclosure, and is intended only to provide an overview or framework for understanding the claimed aspects and embodiments. The accompanying drawings are included to provide illustration and a further understanding of the various aspects and embodiments, and are incorporated in and constitute a part of this specification. The drawings, together with the specification, serve to explain the described and claimed aspects and embodiments.

Generally, the present disclosure is directed to a water treatment system. As used herein, the term "water treatment system" includes any system that is capable of removing or reducing at least some contaminants, impurities, pollution, salt or other unwanted material from a source water where the source water is distilled or where there is otherwise a transition from liquid to vapor or gas and then a transition back to liquid during treatment.

As used herein, the term "source water" refers to liquid introduced into the water treatment system to remove or reduce unwanted material. Source water includes water found in a wide range of conditions, such as but not limited to seawater, brine, brackish water, agricultural runoff, sewage discharge, fresh water, lake water, river water, water used in industrial and commercial processes, aqueous solutions or mixtures thereof.

As used herein, "product water" includes liquid produced after having been passed through the water treatment system or filtration systems or both types of systems, thereby resulting a reduction or removal of contaminants, impurities, or pollution or other unwanted material.

As used herein, the term "water filtration system" is intended to include a device that is capable of removing or reducing contaminants, impurities, or pollution or other unwanted material from water. Additionally, the water filtration system can be able to further sort the removed contaminants, impurities, unwanted material, or pollution. This can include sorting the contaminants such that some are retained and others are discharged.

As used herein, the term "vessel" is intended to include a device that equipped to function when positioned in a body of water. A vessel may be movable, under its own power or moved by another device, or it may be stationary or fixed. Examples of vessels include but are not limited to ships, barges, offshore platforms, or artificial islands.

As used herein, the term "aquatic protection system" is intended to include a system that is capable of protecting aquatic life by preventing the aquatic life from passing through a water treatment system or water filtration system.

According to the disclosure, a water treatment system is capable of producing various types of product water, including, without limitation, as potable water, or agricultural water. In some embodiments, systems according to the disclosure may be used to produce water suitable for other uses, such as fracking or mining. In one preferred embodiment, the water treatment system is used to treat salinated water, including seawater or brackish water, such that the water may be used for agricultural, industrial applications or for consumption by humans or animals. Depending on the dimensions of the water treatment system of the disclosure, Product water may be produced at least tens of gallons per hour or hundreds of gallons per hour per system.

A water treatment system according to the disclosure may assume various dimensions and shapes depending on requirements. In preferred embodiments, the system is portable. For example, the water treatment system may fit on a flatbed truck. In preferred embodiments, one or more water treatment systems fit on a vessel where the water treatment system may be used to treat sea water or brackish water.

In preferred embodiments, the system may be modular. For example, one system may be operably linked or connected to one or more additional water treatment systems, either in series or parallel. In some embodiments, the water treatment systems may share a common power source, common pumping systems, common vacuum sources, common source water or may share piping or combinations of these arrangements. For example, source water may be pumped to several units simultaneously. In other embodiments, product water may be collected from one or more units simultaneously. In some embodiments, product water from a first system may pass through a second system as a source water for the second system.

In some embodiments, the water treatment system may be operably linked or connected to other components and systems. For example, in some embodiments, the water treatment system may be linked to a water filtration system where the source water passes through the water filtration system before entering the water treatment system.

In preferred embodiments, the water treatment system is linked an aquatic protection system. For example, the water treatment system may be linked to an aquatic protection system when the source water is derived from bodies of water that include aquatic life. In particularly preferred embodiments, the water treatment system is used on a vessel to treat salinated water, and is linked or connected to a water filtration system and an aquatic protection system.

In some embodiments, treatment of a source water reduces total dissolved solids by at least 80% in the product water compared to the source water. In some embodiments, treatment of a source water reduces total dissolved solids by at least 90% in the product water. In preferred embodiments, treatment of a source water reduces total dissolved solids by at least 95% in the product water.

According to some embodiments of the disclosure, a water treatment system includes at least one tank, at least one heating element, at least one heat exchanger, at least one vacuum source, at least one power source, and at feast one pump.

The tank holds the source water. In some embodiments, the source water is introduced into the tank through at least one inlet. In some embodiments, a pump pumps water into the tank through the at least one inlet. In other embodiments, the water may be poured into the tank. According to some embodiments, the tank may be divided into one or more chambers, at least one of which may hold the source water.

In preferred embodiments, the tank includes at least one vacuum chamber. A vacuum is created in the vacuum chamber, thereby lowering the pressure in the space above the source water. As a consequence, the source water may transition to water vapor or gas at a lower temperature than at atmospheric pressure. In additional embodiments, the water treatment system includes a vacuum source operably associated with the vacuum chamber. For example, the vacuum source may be a vacuum pump. In other preferred embodiments, the vacuum source may be a supercharger.

In a preferred embodiment, the water treatment system heats the source water in the temperature range of from about 40° C. to about 100° C. In a particularly preferred embodiment, the water treatment system heats the source water from about 90° C. to 97° C. In a preferred embodiment, the water treatment system heats salinated water, such as seawater and brackish water, from 90° C. to 97° C. In a particularly preferred embodiment, the salinated water is heated at from about 92° C. to 95° C.

The tank may contain at least one heating element for heating the source liquid. The at least one heating element is positioned within the tank to optimize heat transfer to the source water. The heating element may be similar to an element for an electric stove.

The tank may contain at least one heat exchanger that is positioned within the tank space to distribute heat during the water treatment process. The positioning of the at least one heat exchanger within the tank transfers heat to the source water, thereby facilitating the transition of the source water to water vapor The positioning of the heat exchanger thereby reduces energy requirements for the water treatment process. The tank may have a plurality of heat exchangers, depending on the size and shape of the tank and volume of source water. In some embodiments, the water treatment system may have two heat exchangers. In further embodiments, the water treatment system may have three heat exchangers and in other embodiments as many as four, or as many as five heat exchangers. In some embodiments, the water treatments system may have more than five heat exchangers. The heat exchangers may be of any type, including plate-type exchangers, rising film-type exchangers or falling-film type exchangers, metal piping or combinations of these types.

Examples of power sources include, but are not limited to engines, supercharger engines, and other similar devices. In one preferred embodiment, the power source is diesel-powered, including biodiesel. In further embodiments, the power source may use wind, solar or geothermal energy sources. In some embodiments, the power source can also be used to input low pressure air into the system.

In further embodiments, source water may introduced into the tank as a mist above the source liquid surface. The misted water may originate from the source water in the tank or may be provided from an external source. Examples of misting devices include, but are not limited to, a spray bar and multiple individual sprayers. Misting may assist in separating solids and other unwanted materials from the water vapor. Misting may also increase the surface area of the source water exposed to the vacuum or to the heat source during the transition to water vapor.

In preferred embodiments, the water treatment includes an evaporator. The evaporator is adapted to transition the source water to produce product water vapor and contaminant concentrate. The evaporator may be a heat exchanger in some embodiments.

In a further embodiment, a vapor compressor is associated with the vacuum chamber to receive product water vapor from the evaporator in the vacuum chamber. The vapor compressor may pump the water vapor at pressure to a heat exchanger. As a result, the at least one heat exchanger recovers heat from outgoing condensing, pressurized product water. In one embodiment, the heat exchanger transfers the heat from the condensing water vapor to transition the source water to product water vapor.

In some embodiments, the water treatment system may have an evaporator/condenser which both boils the source water and also condenses water vapor into product water. The vacuum chamber houses the evaporator/condenser and includes at least one partition to separate the product water from the contaminant concentrate. In some embodiments, the evaporator/condenser includes a plurality of non-porous plates, each of the plates having a surface which on contact heats the source liquid to produce water vapor and a surface which on contact condenses the water vapor into product water. In some embodiments, the plurality of non-porous plates has a hydrophilic outer surface. In some embodiments, the hydrophilic plates have a thickness of between 0.1 mm to 0.25 mm. In some embodiments, the evaporator/condenser is a rising film type heat exchanger. In other embodiments, the evaporator condenser is a falling film type heat exchanger. In yet further embodiments, the evaporator/condenser may include a combination of types of condensers.

In preferred embodiments, the vacuum chamber further includes at least one baffle. The baffle may accelerate vapor velocity to separate droplets of boiling liquid residues from the vapor.

In preferred embodiments, the vacuum chamber further includes a circulator to accelerate vapor formation.

According to some embodiments, the water treatment system includes a degasser. The degasser may remove non-condensable gases from the heated source liquid.

In preferred embodiments, the water treatment apparatus further includes a distillate pump to pump the product water from the vacuum chamber through the at least one heat exchanger. In preferred embodiments, the water treatment system further includes a concentrated source liquid pump to pump the source liquid through the at least one heat exchanger.

Example 1

Figure 1:
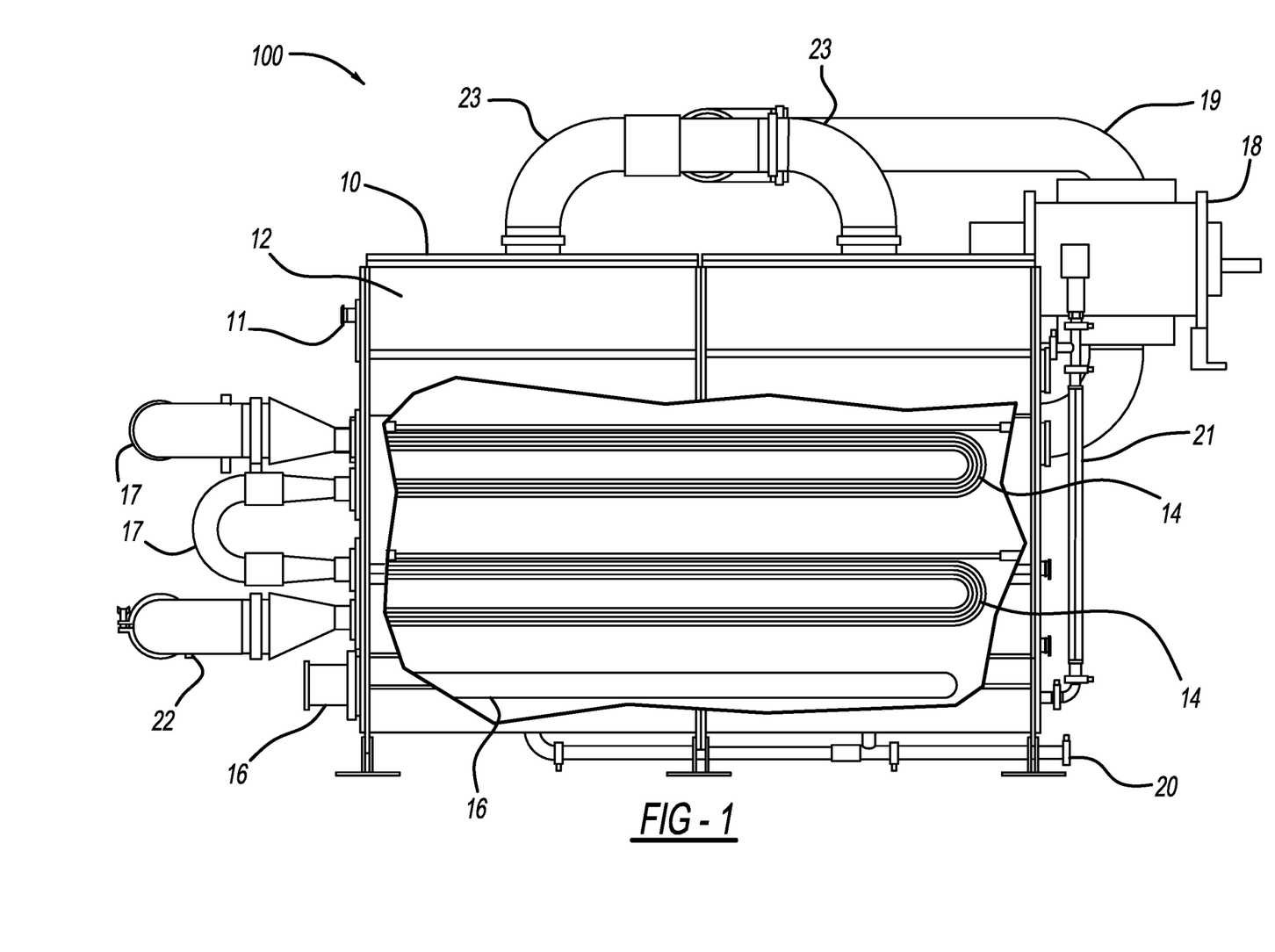
FIG. 1 shows a side view of a water treatment system according to the disclosure where a portion of the water treatment system is cut away.

FIG. 1 shows a schematic view of one embodiment of water treatment system 100 with a portion of the system cutaway to show the interior. Tank 10 includes a vacuum chamber 12. The water treatment system 100 also includes a heating element 16. The water treatment system includes heat exchangers 14. Transfer tubes 17 receive liquid and vapor from heat exchangers 14. The water treatment system 100 also includes a vacuum source 18. In this embodiment the vacuum source 18 is a supercharger. The supercharger 18 is linked to the vacuum chamber 12 through inlet piping 17. Piping 19 connects the inlet piping 23 to the vacuum source 12. This embodiment also includes inlet 11 and outlet 20. Inlet 11 may receive the source water to fill the tank. A sight level is also present 21. Tube 22 receives the final condensed product water for storage or use.

Example 2

Figure 2:
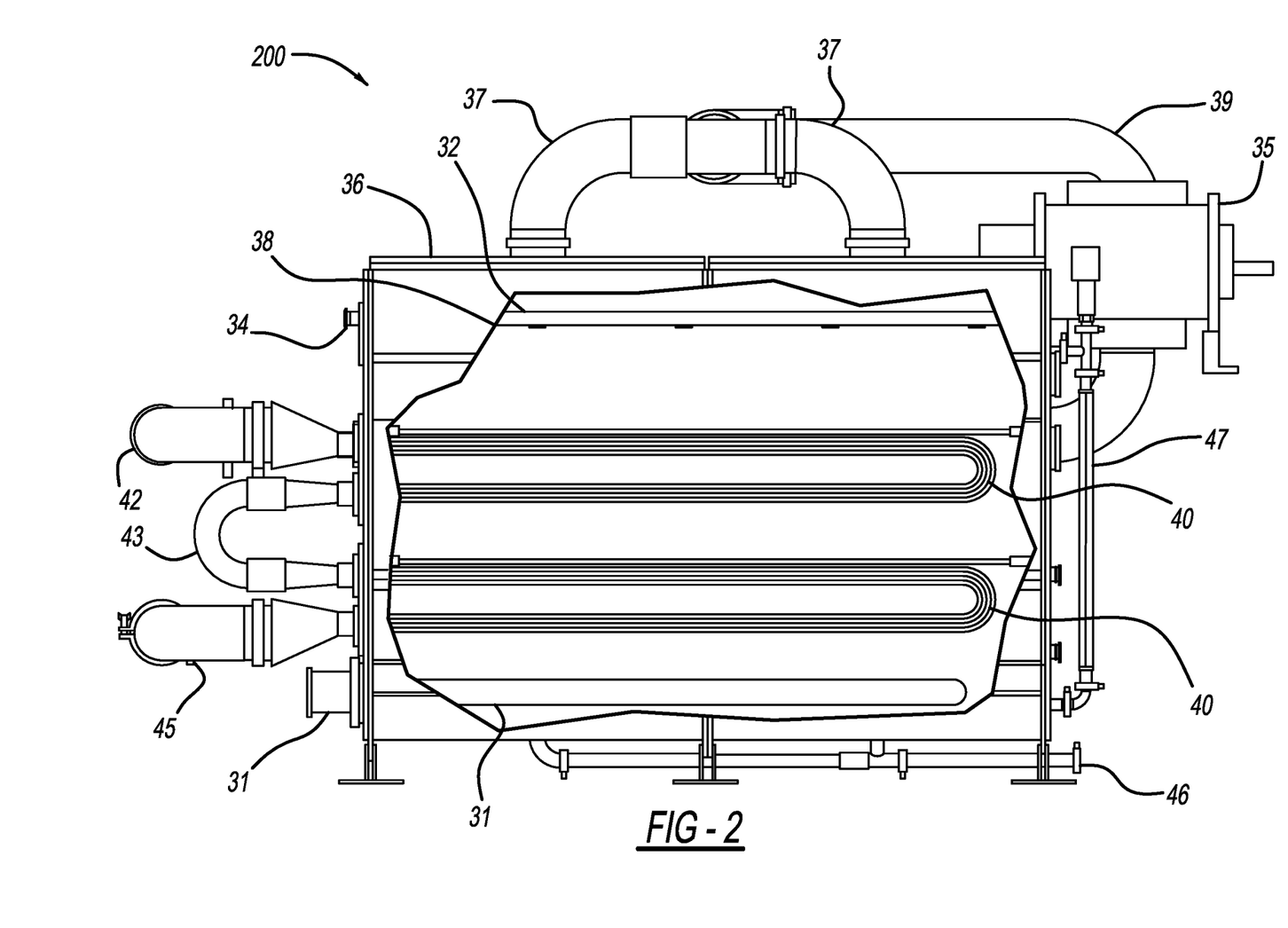
FIG. 2 shows a side view of a water treatment system according to the disclosure where a portion of the water treatment system is cut away.

FIG. 2 shows a schematic view with a cutaway showing a portion of the interior of a further embodiment of water treatment system 200. The water treatment system 200 includes tank 36. The tank has a misting spray bar 32 connected to inlet 34. Tank 36 includes a vacuum chamber 38. The water treatment system 200 also includes a heating element 31. The water treatment system includes a first heat exchanger 33 which acts as an evaporator. In this embodiment, the first heat exchanger is a copper pipe. The system also includes further heat exchangers 40. The water treatment system 200 also includes a vacuum source 35. In this embodiment the vacuum source 35 is a supercharger.

According to preferred embodiments, heating element 31 heats the source water. Vacuum source 35 creates a vacuum in the vacuum chamber 38. Source water is pumped through inlet 34 to a spray bar 32 to create a mist over the first heat exchanger 33 which acts as an evaporator. The first heat exchanger 33 is only partially submerged in the source water. As a result, a portion of the source water transitions from a liquid to vapor state upon contact with the first heat exchanger which acts to evaporate the source water. The water vapor is drawn into piping 37,39 due to the vacuum created by the vacuum source 35. The vacuum source 35 compresses the water vapor, thereby generating heat. The pressurized and heated water vapor passes through further heat exchangers 40 where heat is transferred from the product water vapor to the source water, including both tank water and the misted water. During passage through the further heat exchangers, the water vapor passes through transfer tubes 42, 43, 45.

As the water vapor passes through heat exchangers 40, additional heat is transferred to the source water and the water vapor condenses into liquid product water. The product water is drawn off via transfer tube 45 from the water treatment system 200 for storage or for use.

The concentrated contaminant water that results from the water treatment process is heavier than the original source water and is drawn off through an inlet 46 at the bottom of the tank. The concentrated contaminant water may be passed through an external heat exchanger to transfer heat.

The tank may be constantly replenished with source water via monitoring of tank levels, using appropriate electronic systems. In addition, the water treatment system includes a visual sight level of source water 47.

Figure 3:
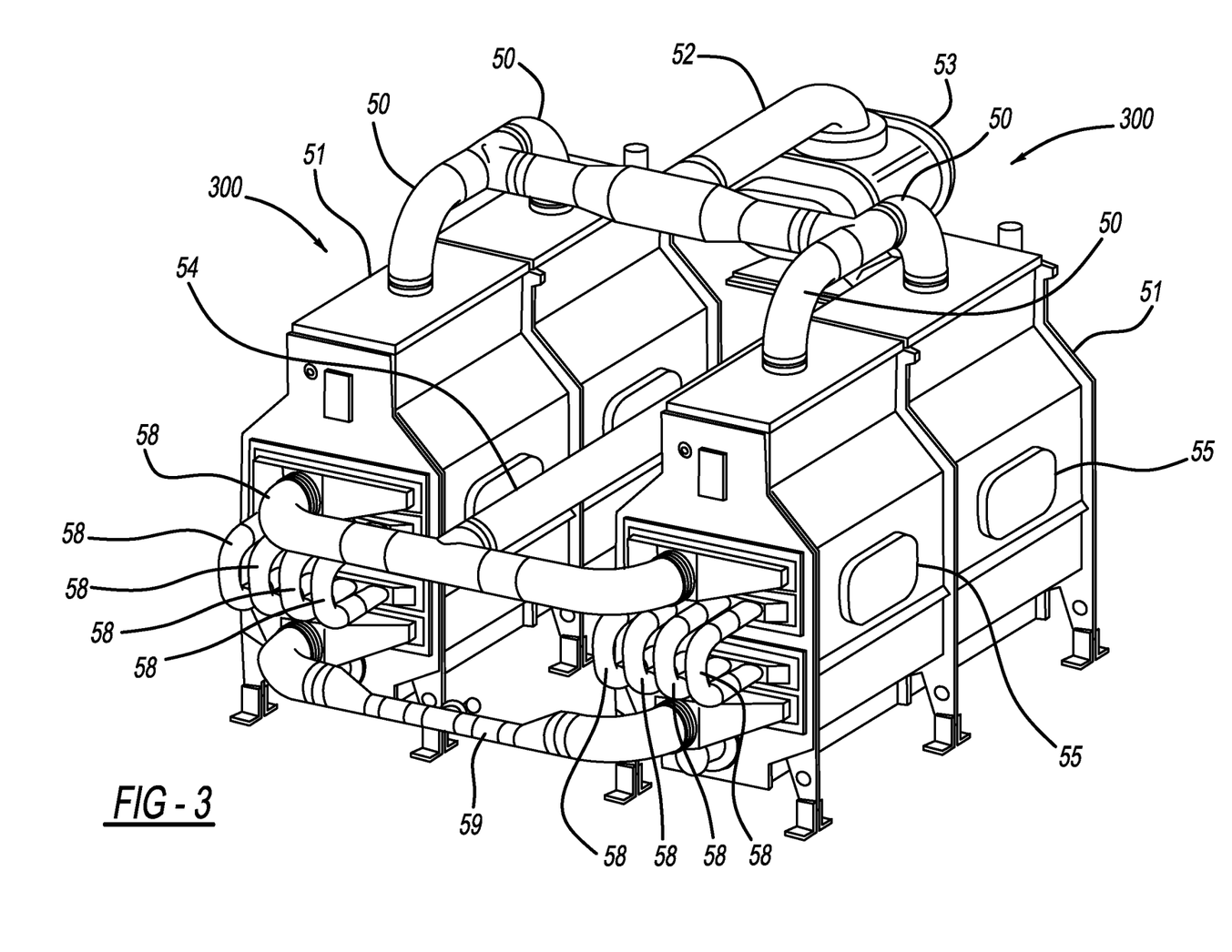
FIG. 3 shows a perspective view of two linked water treatment systems according to the disclosure.

FIG. 3 shows an external view of an embodiment where two water treatment systems 300 are linked. Each system has tank 51 which may have viewing windows 55. The tanks include a vacuum chamber, an evaporator and a plurality of heat exchangers (not shown). Piping 50 is engaged with the water treatment systems 300. The units share common piping 52 which leads to a single supercharger 53. The supercharger 53 compresses water vapor from both systems and transfers the heated water vapor through piping 54 to heat exchangers contained within the tank of each system 300. Transfer tubes 58,59 allow the passage of water vapor through the heat exchangers. Sight level 61 is also present.

Figure 4:
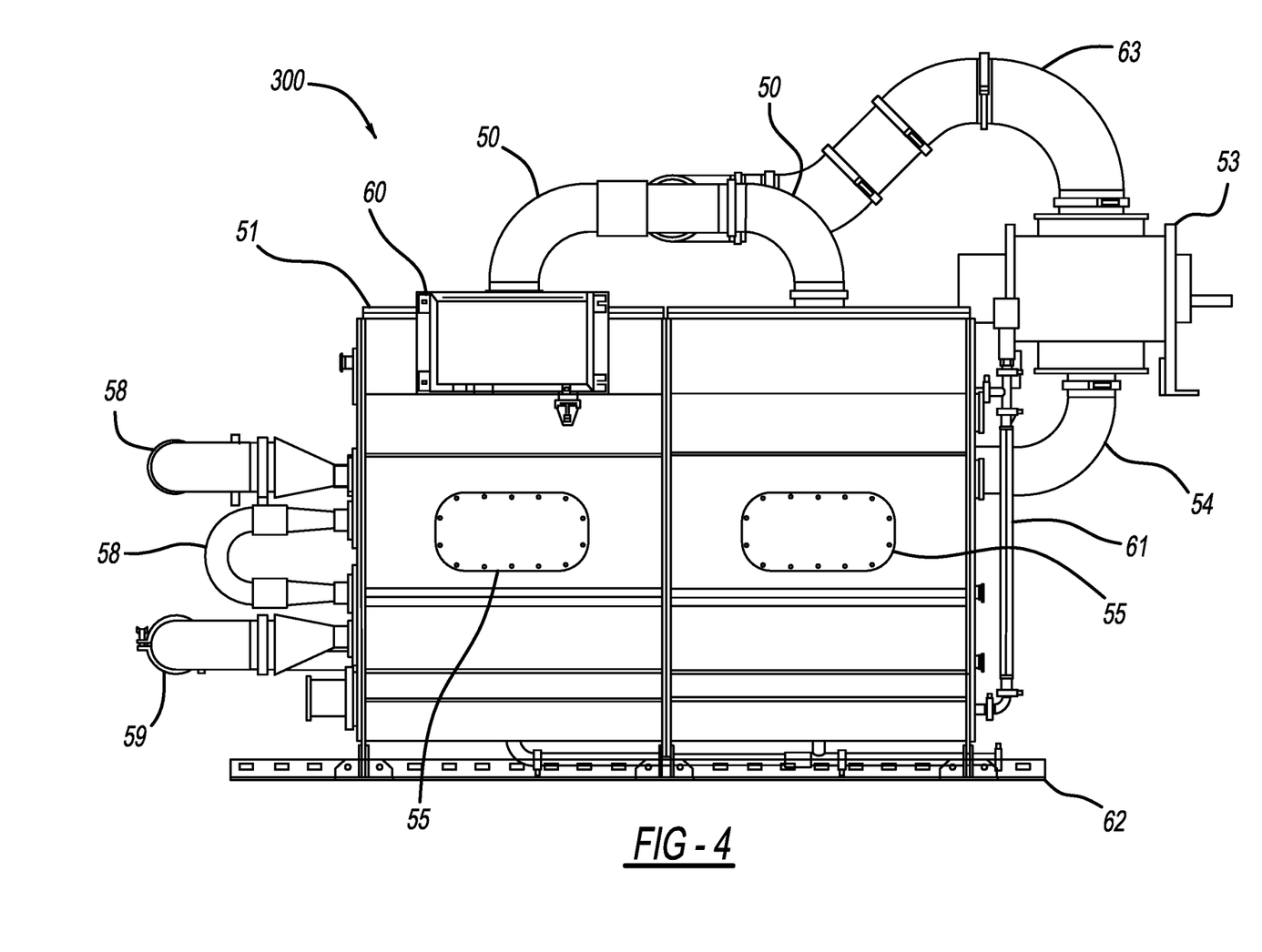
FIG. 4 shows a similar embodiment to the linked water treatment systems of FIG. 3 as seen from the side.

FIG. 4 is a sideview of an embodiment similar to the embodiment shown in FIG. 3 showing the side of one system when two systems are linked. The system 300 has tank 51 which may have viewing windows 55. The tanks include a vacuum chamber, an evaporator and a plurality of heat exchangers (not shown). Piping 50 is engaged with the water treatment unit 300. The units share common piping 63 which leads to a single supercharger 53. The supercharger 53 compresses water vapor from both systems and transfers the heated water vapor through piping 54 to heat exchangers contained within the tank of the system 300. Transfer tubes 58,59 allow the passage of water vapor through the heat exchangers. Control box 60 and sight level 61 are also present. The water treatment system 300 may be mounted on a platform.

Figure 5:
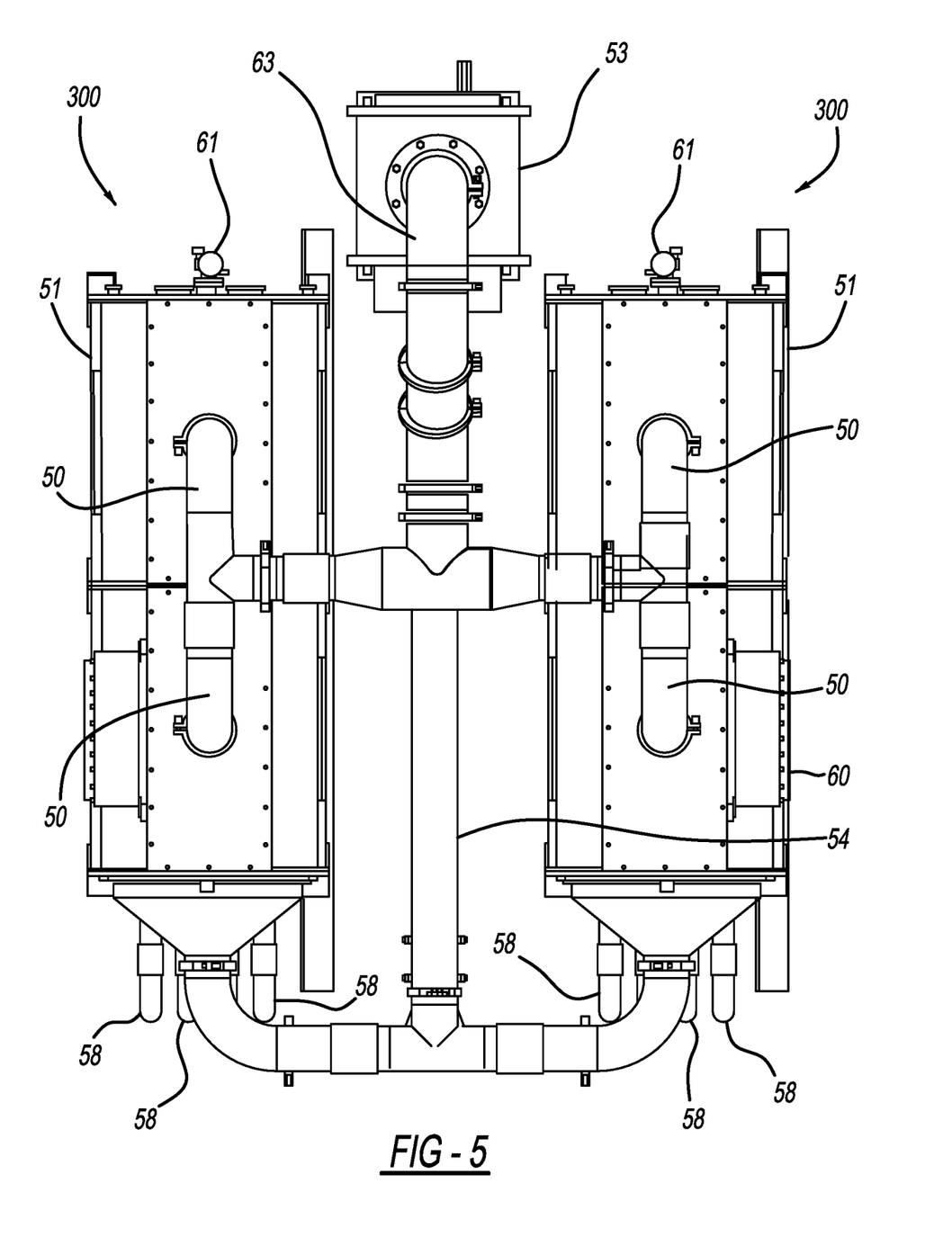
FIG. 5 shows a similar embodiment to the linked water treatment system of FIG. 3 as seen from above.

FIG. 5 is a top view of an embodiment showing two linked water treatment systems 300 Each system has tank 51. The tanks include a vacuum chamber, an evaporator and a plurality of heat exchangers (not shown). Piping 50 is engaged with the water treatment unit 300. The units share common piping 63 which leads to a single supercharger 53. The supercharger 53 compresses water vapor from both systems and transfers the heated water vapor through piping 54 to heat exchangers contained within the tank of each system 300. Transfer tubes 58,59 allow the passage of water vapor through the heat exchangers. Control box 60 and sight level 61 are also present.

Example 4

Table 1 shows the results obtained when a sample source water is passed through a water treatment system according to the disclosure to produce a product water. The source water was passed through a system similar to that shown in FIG. 2. The Table shows the decrease in the specified analytes in a product water after treatment of a sample source water. The Table also identifies the relevant Environmental Protection Agency (EPA) standards for drinking water.

TABLE 1

| Analyte | Source Water | Product Water | Units | % Removed | EPA STD |
|---|---|---|---|---|---|
| Total Dissolved Solids (Residue, Filterable) | 20800 | 145 | mg/L | 99.30% | 500* |
| Chloride | 6360 | 28.4 | mg/L | 99.55% | 250 |
| Sulfate | 10700 | 55.4 | mg/L | 99.48% | 250 |
| Boron | 2.31 | 0.0449 | mg/L | 98.06% | |
| Molybdenum | 0.0204 | 0.00200 | mg/L | 90.20% | |
| Total Organic Carbon | 18.7 | 2.24 | mg/L | 88.02% | 3** |
| Barium | 0.0278 | 0.00510 | mg/L | 81.65% | 2 |
| Manganese (Dissolved) | 0.0146 | 0.00300 | mg/L | 79.45% | 0.050 |
| Nitrate-N | 0.777 | 0.172 | mg/L | 77.86% | 10 |
| Selenium | 0.00612 | 0.00200 | mg/L | 67.32% | 0.050 |
| Lead | 0.00151 | 0.000595 | mg/L | 60.60% | 0.015 |
| Arsenic | 0.00476 | 0.00200 | mg/L | 57.98% | 0.010 |
| Aluminum | 0.0382 | 0.0172 | mg/L | 54.97% | 0.05-0.2* |
| pH | 8.20 | 7.30 | pH Units @ 17.4° C. | | 6.5-8.5 |

*= Environmental Protection Agency National Secondary Drinking Water Regulation
**Source http://www.env.gov.bc.ca/wat/wq/BCguidelines/orgcarbon/drinking.html Example 5

According to the disclosure, one or more water treatment systems may be used with one or more aquatic protection systems where the aquatic protection system is present when the source water contains aquatic life. In some embodiments, the aquatic protection system 400 is employed when the water treatment system is placed on a vessel. An aquatic protection system 400 is shown schematically in cross-section in FIG. 6. In some embodiments, the aquatic protection aquatic protection system 400 includes a device such as a winch 70 or other power assist system to deploy and retract the aquatic protection aquatic protection system 400 about the vessel 81. The aquatic protection aquatic protection system 400 can include a plurality of adjustably connected aquatic protection system segments 74. The aquatic protection system segments 74 can be connected by hinges 76. The hinges 76 allow the segments 74 to adjustably move to follow the contours of the vessel 81, to allow the segments 74 to be stored compactly. The segments 74 can be covered in whole or in part by at least one layer or mesh 78. The mesh 78 can be of a variety of materials, such as but not limited to stainless steel, plastic, graphene, carbon fiber, or other materials known by those of skill in the art. The mesh 78 can include more than one layer, either of same material or different materials, depending upon the situation in which the aquatic protection system 400 is deployed. For example, if primarily larger aquatic life is to be protected, then the mesh 78 can be arranged with larger water passages. If smaller and larger aquatic life is to be protected, then the mesh 78 can be arranged with smaller water passages.

Figure 6:
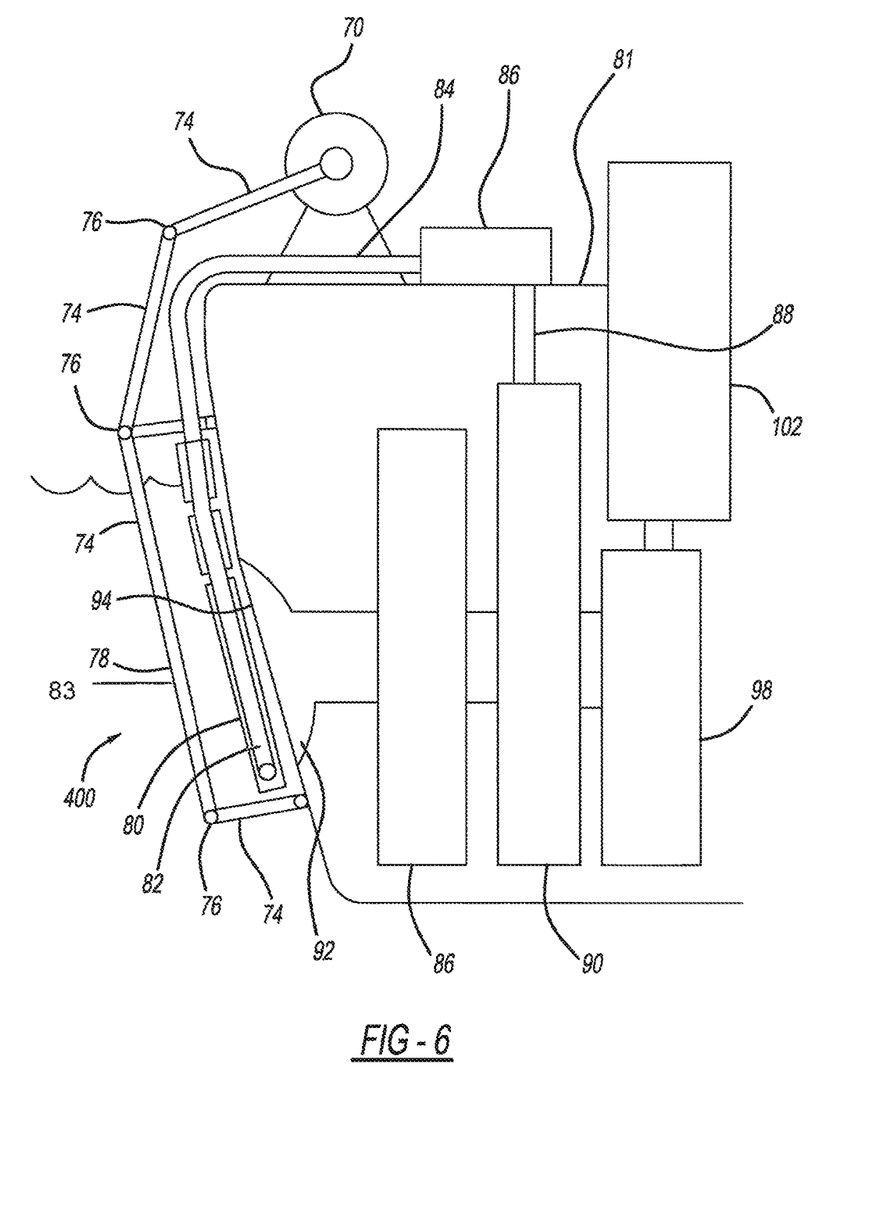
FIG. 6 shows a schematic view of an aquatic protection system according to the disclosure, as employed on a vessel with a water treatment system.

The aquatic protection aquatic protection system 400 can also include a water spray system 80 which includes nozzles 82. The nozzles 82 are located on at least a portion of the aquatic protection system 400 that is in contact with the water. The nozzles 82 expel water, creating areas of turbulence that prevent aquatic life from approaching the aquatic protection system 400. The nozzles 82 are supplied with water from an aquatic protection system supply hose 84 connected to an aquatic protection system pump 86. The aquatic protection system pump 86 includes a water intake hose 88 and optional aquatic protection system filter 90

The aquatic protection system 400 may be positioned adjacent to a water intake 92, located about the vessel 81. The water intake 92 can be located at various locations about the vessel 81. For example, and without limitation, the water intake 92 can be located about the vessel 81, such as along the sides or bottom. In other embodiments, the water intake 92 can be located some distance from the vessel, using an extension pipe or tube. In the example of the vessel being a platform, the water intake can be located in one or more of the platform support pillars. The water intake can include a tapered intake entrance to funnel and accelerate water. The aquatic protection system can include connections 94 These connections can include clasps, bolts, magnets, hooks, or other types of connections.

The aquatic protection system 400 may include a water pump 96. The water pump 96 is located on the vessel 81 and is in fluid communication with the water intake 92. The water pump 96 can receive power from the vessel 81 or it can be independently powered, such as through a gasoline engine. The water pump 96 creates suction to draw water through the aquatic protection system 400 and then through the water intake 92 to the water treatment system 98. The water pump 96 can also provide water for the nozzles 82 of the aquatic protection system in one embodiment. The water pump 96 can also propel or draw water through other components of aquatic protection system 400, as discussed in detail below.

The aquatic protection system 400 may include at least one water treatment system 98. The water treatment system 98 can receive power and/or be controlled by vessel 98, or the water treatment system 98 can include its own power source and control system. The water treatment system 98 can be adjustable to adapt to changing intake water conditions. For example, if the aquatic protection system 400 is located at a tidal estuary, the intake water can vary in brackishness with the tides and other variables. The water treatment system 78 can adjust the treatment of the intake water based on these changes by taking sections of the water treatment system 78 online or offline. In some embodiments, a water filtration system 83 can remove contaminants before the intake water reaches the water treatment system 98.

The aquatic protection system 400 may include a storage tank 102. The storage tank is a repository for the treated water produced by the water treatment system 98. The storage tank can be located on the vessel 81, or in other locations, such as but not limited to another vessel, an onshore location connected via a pipeline, or another location known by those of skill in the art. The storage tank can include devices (not shown) to maintain the condition of the treated water, such as but not limited to refrigeration, ultraviolet lights, filters, or water conditioners. The storage tank can include other devices (not shown) to transport the treated water from the storage tank when desired such as but not limited to pumps, valves, or pipes.

In another embodiment, the aquatic protection system includes the mesh, an electrification system, and the water spray system. These three elements combine to prevent aquatic life, large and small, from passing through the aquatic protection system The aquatic protection system can be deployed about the vessel covering the water intake. Some of the segments of the aquatic protection system engage the hull of the vessel and are held in place by the pressure exerted by the winch or other devices, such as but not limited to clamps, magnets, or fasteners. By having the aquatic protection system securely in contact with the hull of the vessel, aquatic life is prevented from entering the water intake behind the aquatic protection system. The segments of the aquatic protection system that contact the hull of the vessel can also include seals (not shown) to prevent the flow of water between the hull and the adjacent segments.

Figure 7:
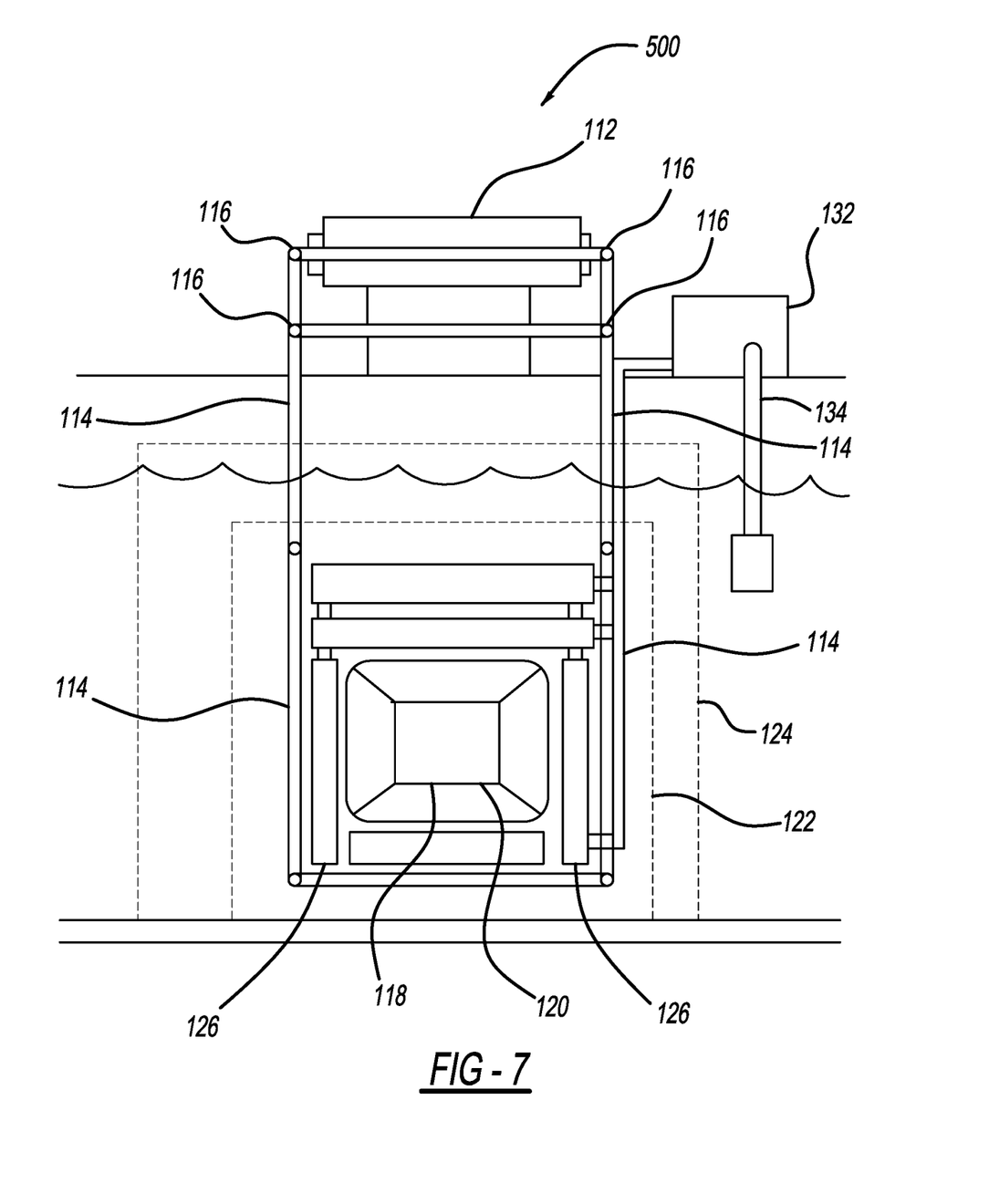
FIG. 7 shows a view of an aquatic protection system and a water treatment system according to the disclosure as viewed towards the side of a vessel.

FIG. 7 shows an embodiment of the aquatic protection system 500 as seen looking towards a vessel 110 at water level. The aquatic protection system 500 includes a winch 112 to deploy or retract the system 500. The system includes segments 114 which are joined by hinges 116. The system may be covered by a mesh 118. The system 500 is placed over water intake 120 on the vessel. The vessel may also include pump 122 and water treatment system 124.

This embodiment also includes an array of nozzles 126 located near water intake 120. The nozzles spray water from supply hose 128 using pump 130. Water for the nozzles may originate from pump/filter 132 through supply hose 134.

Figure 8:
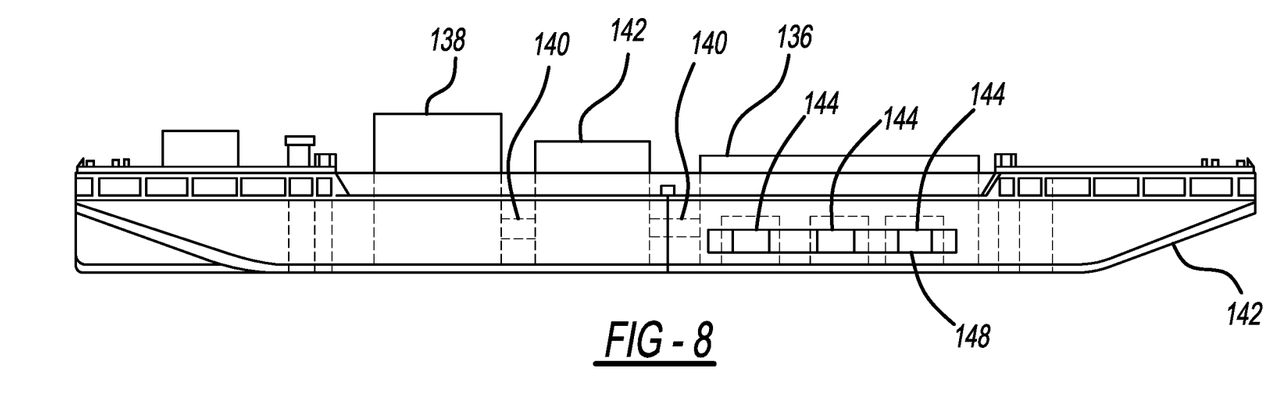
FIG. 8 shows a diagram of a vessel shown from the side with a portion of the vessel cutaway, showing a water treatment system of the disclosure and employing an aquatic protection system.
Figure 9:
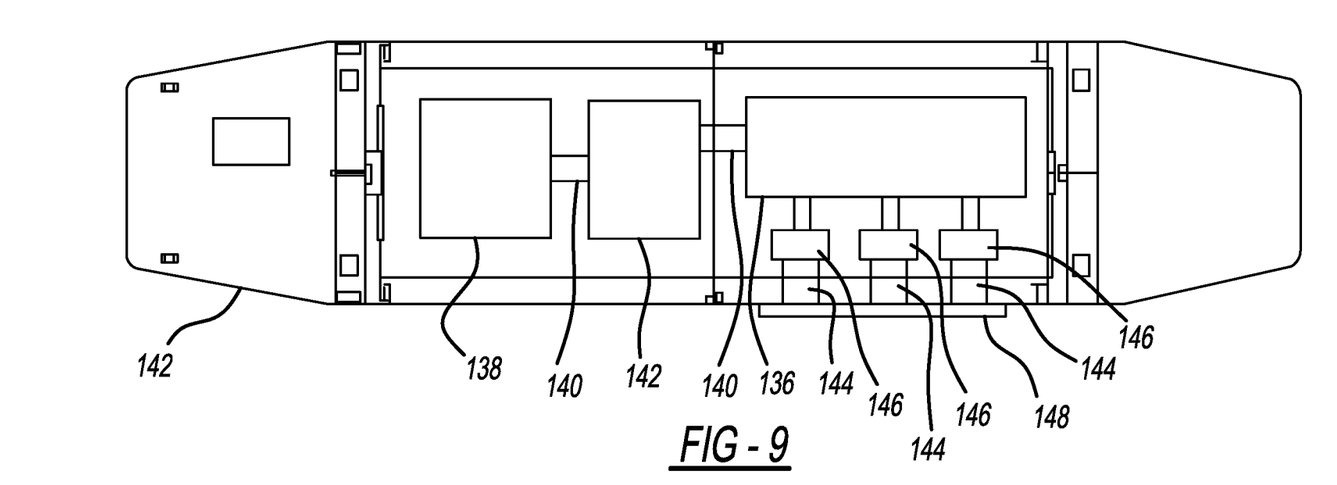
FIG. 9 shows a diagram of a vessel from above, showing a water treatment system of the disclosure and employing an aquatic protection system.

FIGS. 8 and 9 show one embodiment of a vessel 142 employing the systems according to the disclosure. FIG. 7 shows the vessel from above and FIG. 8 shows the vessel in cross-section from the side. In this embodiment, water treatment system 136 is linked to tank 138 through piping 140. The water treatment system 136 is also linked to water filtration system 142. In this embodiment, the vessel has three water intakes 144 each with an associated pump 146. In this embodiment, a single aquatic protection system 148 according to the disclosure is fitted over all of the intakes.

Figure 10:
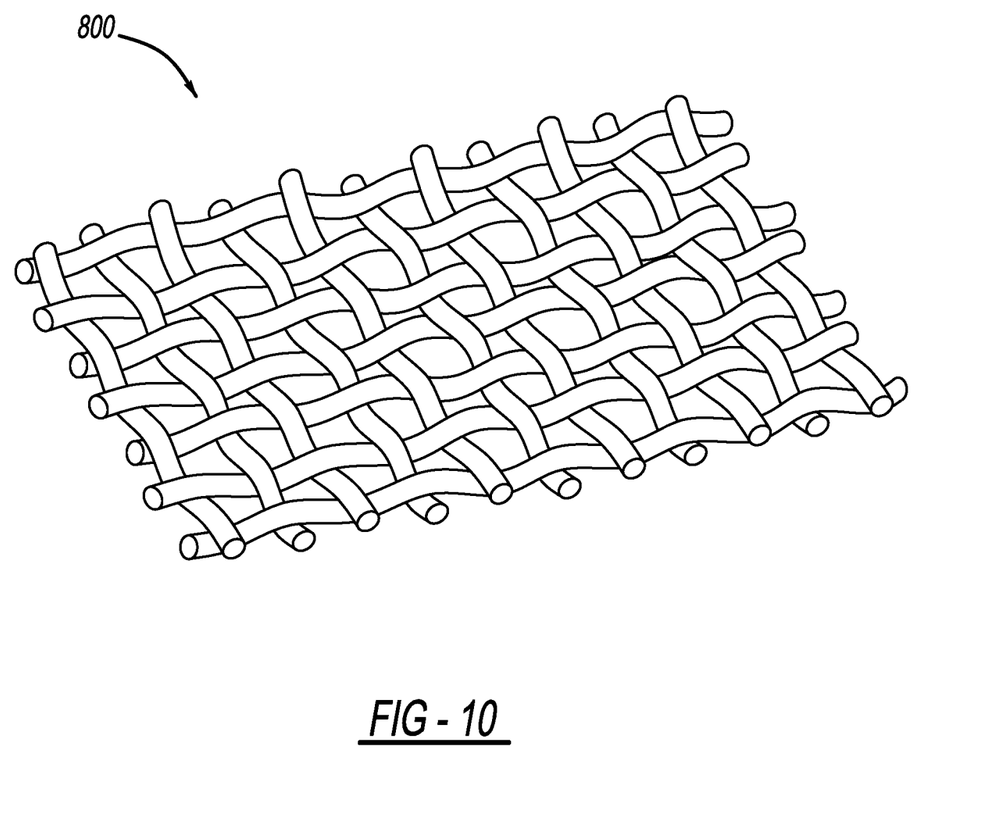
FIG. 10 shows an example of mesh that may be used with an aquatic protections system of the disclosure.

FIG. 10 shows an embodiment of mesh 800 that may be used with an aquatic protection system of the disclosure.

Throughout this application, author and year and patents by number reference various publications, including United States patents. Full citations for the publications are listed below. The disclosures of these publications and patents in their entireties are hereby incorporated by reference into this application in order to more fully describe the state of the art to which this disclosure pertains.

Obviously, many modifications and variations of the present disclosure are possible in light of the above teachings. It is, therefore, to be understood that within the scope of the described disclosure, the disclosure can be practiced otherwise than as specifically described.

The invention claimed is:

1. A system for treating salinated water, comprising:
   A water treatment system, comprising:
   at least one tank comprising;
   at least one vacuum chamber;
   at east one heating element;
   at east one evaporator;
   at least one heat exchanger;
   at least one vacuum source;
   at least one power source;
   and at least one pump;
   piping external to said tank, said piping fluidly connecting said at least one vacuum chamber and said at least one heat exchanger;
   and
   an aquatic protection system.

2. The water treatment system of claim 1 wherein said system for treating salivated water is placed on a vessel.

3. The water treatment system of claim 1 wherein said aquatic protection system comprises a water sprayer having nozzles located on at least a portion of the aquatic protection system that is in contact with water.

4. The water treatment system of claim 1 wherein said system for treating salinated water is placed a fixed vessel.

5. The water treatment, system of claim 1 wherein said aquatic protection system comprises an electrification system.

6. The water treatment system of claim 1 wherein said aquatic protection system comprises mesh wherein said mesh comprises a material selected from the group consisting of stainless steel, plastic, graphene, carbon fiber and combinations thereof.

* * * * *